(12) United States Patent
Gorelik et al.

(10) Patent No.: US 9,672,404 B2
(45) Date of Patent: Jun. 6, 2017

(54) ACTIVE BIOMETRIC AUTHENTICATION WITH ZERO PRIVACY LEAKAGE

(71) Applicants: Victor Gorelik, Brooklyn, NY (US); Natalia Hanson, Brooklyn, NY (US)

(72) Inventors: Victor Gorelik, Brooklyn, NY (US); Natalia Hanson, Brooklyn, NY (US)

( * ) Notice: Subject to any disclaimer, the term of this patent is extended or adjusted under 35 U.S.C. 154(b) by 539 days.

(21) Appl. No.: 13/936,190

(22) Filed: Jul. 7, 2013

(65) Prior Publication Data

US 2015/0012742 A1   Jan. 8, 2015

(51) Int. Cl.
*H04L 29/06* (2006.01)
*G06K 9/00* (2006.01)
*G06F 3/0354* (2013.01)
*H04L 9/32* (2006.01)

(52) U.S. Cl.
CPC ..... *G06K 9/00033* (2013.01); *G06F 3/03543* (2013.01); *H04L 9/3231* (2013.01); *H04L 63/0861* (2013.01); *H04L 2209/42* (2013.01)

(58) Field of Classification Search
USPC ........ 713/155, 150, 163, 181; 726/2, 26, 36; 380/255, 264, 276
See application file for complete search history.

(56) References Cited

U.S. PATENT DOCUMENTS

| | | | | |
|---|---|---|---|---|
| 2006/0126905 | A1* | 6/2006 | Loo | 382/118 |
| 2008/0104415 | A1* | 5/2008 | Palti-Wasserman et al. | 713/186 |
| 2011/0135165 | A1* | 6/2011 | Wechsler et al. | 382/118 |
| 2012/0110340 | A1* | 5/2012 | Lyseggen et al. | 713/186 |

\* cited by examiner

*Primary Examiner* — Farid Homayounmehr
*Assistant Examiner* — Sharif E Ullah (57) ABSTRACT

The invention provides a method for frequent verifications of the identity of a user performed during a long session of client-server communication by secure exchange of keys between the client and the server. A user is represented at the server by a set of random numbers that have nothing to do with his biometric data. The server initiates authentication requests by sending encoded randomly generated permutation to the client. On each request, the client creates a dynamic response key built by using the decoded permutation and biometric data of the user so that this biometric data cannot be retrieved from the key. The key also includes the correlation coefficient between the sound of the user's breathing and the distance between the most outer sides of the wings of his nose and the correlation coefficient between the area of the user's pupil and the brightness of his computer screen.

2 Claims, 8 Drawing Sheets

ACTIVE BIOMETRIC AUTHENTICATION WITH ZERO PRIVACY LEAKAGE

CROSS REFERENCE TO RELATED APPLICATIONS

Not applicable.

STATEMENT REGARDING FEDERALLY SPONSORED RESEARCH AND DEVELOPMENT

Not applicable.

REFERENCE TO SEQUENCE LISTING, A TABLE, OR A COMPUTER PROGRAM LISTING COMPACT DISC APPENDIX

Not applicable.

TECHNICAL FIELD

This invention relates to authentication of a user in client-server communication, in particular to multiple authentications of a user performed during a long session (5 minutes or more) of client-server communication, by secure exchange of keys between the client and the server where a key submitted by the client to the server is built with the help of biometric information of the user but this information cannot be retrieved from the key by any means.

BACKGROUND

There are different authentication schemes in computer security that perform user authentication in client-server communication. A traditional scheme, which is usually used by a user to log in to the server, is based on security credentials provided by the user, e.g., a password or a fingerprint. Another scheme—active biometric authentication, which is the subject of the present invention, is used during a long session of client-server communication, which starts when a user logs in to the server and ends when he logs out. During a long session, a series of user authentications is done to make sure that the same user is in control of the client during the entire session. This scheme does not require any intended actions from a user; user authentications are performed seamlessly, without interruptions of user activity.

To perform a series of user authentications, the server generates authentication requests. On each request, the server creates and sends a request key to the client. Specific biometric information of a user is being collected in background on the client during an entire session. In reply to a request from the server, the client uses this biometric information to create a response key to the server. The server authorizes or denies further access of the user to the server based on the received response key.

The main problem of biometric authentication is how to determine whether two biometric data records are close or not, and if they are close, will they remain close after their encryption?

The theory of biometric encryption (Y. Dodis, R. Ostrovsky, L. Reyzin, A. Smith. "Fuzzy Extractors: How to Generate Strong Keys from Biometrics and Other Noisy Data." Proc. Eurocrypt, 2004, pp. 523-540, 2004) treats a biometric data record as a string and defines the distance between two equal length strings as the number of locations in which these strings differ. This definition of distance leads to the fact that two biometric data records having a small distance before encryption can have a large distance after that. As a result of encoding, two biometric data records that are close at the client can be very different at the server, and it can lead to errors in authentication process. The problem can be solved by using representation templates related to a user's biometric data.

This kind of biometric encryption implies a small but non-zero privacy leakage. Moreover, if a hacker gets access both to templates and to encryption algorithms, he can obtain biometric data of an authorized user and access the server (A. Cavoukian, A. Stoianov. 2007. Biometric Encryption: A Positive-Sum Technology that Achieves Strong Authentication, Security AND Privacy. Discussion paper of the Office of the Information and Privacy Commissioner of Ontario, 2007).

Besides protection of representation templates by means of cryptography, it is possible to protect templates by intentionally distorting biometric data (U.S. Pat. No. 6,836,554). Such feature transformation methods have difficulties in theoretical analysis related to closeness of biometric records and problems of irreversibility and unlinkability of transformations (Manabu Inuma, Akira Otsuka. 2013. Relations among Security Metrics for Template Protection Algorithms. arXiv:1212.4195 v2 [cs.CR]. Cornell University Library).

Another serious problem of biometric authentication is an imitation of an authorized user. Most of known authentication methods, for example, the method proposed in the U.S. Pat. No. 8,261,090 and the method proposed in the U.S. Pat. No. 8,326,001 can be tricked by using a latex mask or a high quality picture of an authorized user and a record of his voice simultaneously; this is an illustration of unsatisfactory security of client-server communication.

The main problems of the prior art are insufficient security of client-server communication and unsatisfactory privacy of a user.

SUMMARY

It is therefore an objective of the present invention to provide a method for active biometric user authentication in client-server communication that gives both better security of communication and better privacy of a user compared to known authentication methods.

In the proposed method, a biometric data record is treated as an array of numbers. The closeness between two biometric data records is measured by the correlation coefficient between two arrays corresponding to these records. Using this definition of closeness, a strong encryption that preserves near matches between enrollment and operational biometric data of a user is proposed. On each authentication request key from the server, the client creates a fuzzy dynamic response key. A response key created by the client is dynamic because it depends on a randomly generated request key sent from the server. At the same time, a response key is built using biometric data of a user, so the key is fuzzy (imprecise) in the same degree as that biometric data. It is important that even though biometric data is used to build a response key, it cannot be retrieved from the key. Using fuzzy dynamic keys on each request/response in active biometric authentication process makes it practically impossible to break security of client-server communication.

The advantages of the proposed method are as follows:
a user is represented at the server by a set of random numbers that have nothing to do with his biometric data, so his real biometric data cannot be retrieved even theoretically from data of the server if it is compromised;

the method provides zero leakage of the privacy of a user because none of biometric data is stored on hardware of the server or the client and none of biometric data is transmitted between them;

a fuzzy dynamic key created by the client are not saved anywhere, so there is no need to create/memorize/store any passwords; there is also no need to store any helper data;

the method is resistant to known types of hacker attacks, including offline attacks the method provides regular frequent authentications of a user without interruption of his activity from the beginning of a session to the end.

Two techniques for protection against imitations of an authorized user are also proposed in the current invention.

The first technique is based on the fact that there is a correlation between biometric data of a user if it is collected by two different sensors. For example, the sound of a person's breathing recorded by a microphone correlates with unintended movements of the wings of his nose. Such movements can be extracted from a sequence of images of a user's face recorded by a webcam. Comparison of data recorded by a microphone and by a webcam makes it possible to detect a static imitation of an authorized user made by a hacker in order to get access to the server.

The second technique is based on the fact that changes in the brightness of a computer screen affects the diameter of a user's pupil. Video recording of the reaction of a user's pupil to changes in screen brightness makes it possible to detect a dynamic imitation of the user, for example, if a hacker uses a pre-recorded movie of an authorized user in order to get access to the server.

The proposed method for active user authentication that employs fuzzy dynamic keys and two correlation techniques are used in the present invention as the base for an authentication system that provides exceptional security of client-server communication, cannot be fooled by an imitation of an authorized user, and fully protects privacy of his biometric data.

DETAILED DESCRIPTION OF THE INVENTION

To participate in client-server communication, a user creates an account on the server.

A user gets access to his account (logs in to the server) using an access card on the client computer. In the proposed method, an access card of a user contains non-biometric and biometric data. The biometric data of the card is used only on the client and is never transmitted to the server. When a user submits his card to the client, the client takes a picture of the user's face with a webcam, extracts the biometric data from the picture, and compares this data to the biometric data of the card. This is made to verify that the actual owner of the card is trying to log in to the server. If biometric data extracted by the client and the biometric data of the card match, then the non-biometric data of the card is submitted to the server and the user logs in to the server. The described verification is performed in the step 1 of the proposed method.

The proposed method for active biometric user authentication during a session of client-server communication includes the following steps:

(1) A login of a user to a session;
(2) Surveillance of the user;
(3) Requests generated by the server;
(4) Responses generated by the client;
(5) Identity verifications of the user performed by the server.

Figure 1:
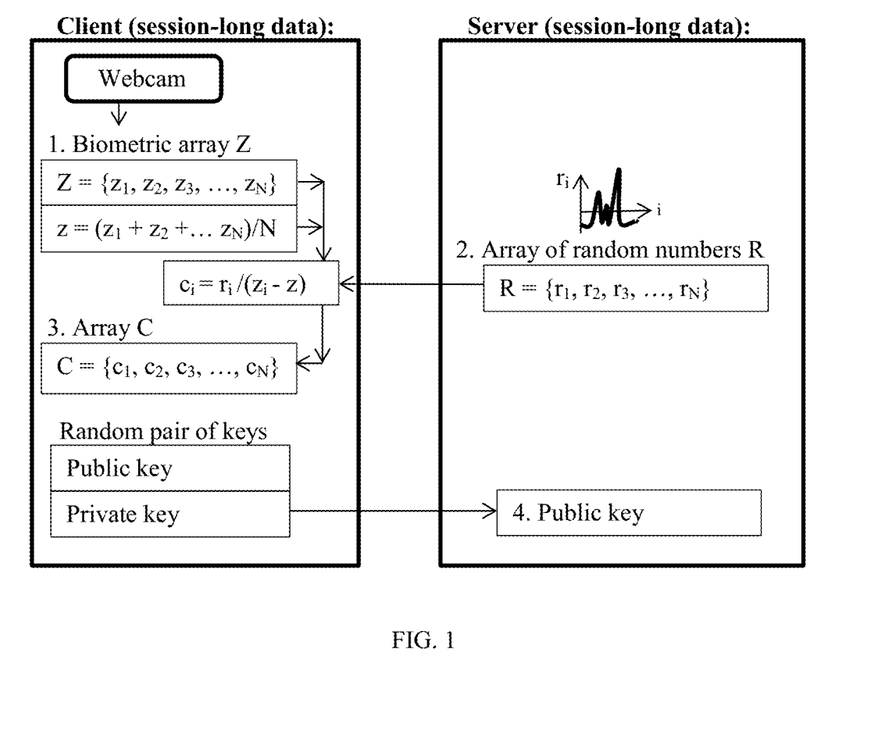
FIG. 1 illustrates a login of a user to a session of client-server communication.

FIG. 1 illustrates the sequence of four operations performed in the step 1 (a login of a user to a session) of the method.

The first operation in the step 1:
biometric data of a user is extracted from a picture of his face made with a webcam on the client as an array Z of N components:

$$Z=\{z_1, z_2, z_3, z_4, \ldots, z_N\}.$$

An example of a technique for extracting a biometric array based on a facial image is given below. The biometric array Z is verified against the biometric data of the access card of the user to make sure that the actual owner of the card—not somebody else with his card—is trying to log in to the server and to a session. If the biometric data of the card and the biometric data of the array Z match, then the non-biometric data of the access card is submitted to the server and the user logs in to the server and to a session; otherwise, the non-biometric data of the card is not submitted to the server, so the user is not allowed to log in to the server.

The components of the array Z are internal variables of a program running on the client. The assumption is used that these variables cannot be accessed by a hacker. At the same time, data stored on hardware of the client or the server, data transmitted between the client and the server, and all encoding/decoding algorithms are considered accessible to a hacker.

The second operation in the step 1:
a representational array $R=\{r_1, r_2, r_3, \ldots, r_N\}$ of random numbers is generated on the server. These numbers have nothing to do with biometric data of the user. The array R represents the user on the server until the end of the session.

The third operation in the step 1:
an array $C=\{c_1, c_2, c_3, \ldots, c_N\}$ is calculated on the client by the formulas $$c_1=r_1/(z_1-z), c_2=r_2/(z_2-z), c_3=r_3/(z_3-z), \ldots, c_N=r_N/(z_N-z), \tag{1}$$

where $z=(z_1+z_2+z_3+\ldots+z_N)/N$. The formulas (1) are chosen to make $R=C*(Z-z)$. If one of the components of the array Z is equal to z, e.g., $z_1=z$, then the calculation of C using the formulas (1) is impossible (division by zero). Such a situation can be easily avoided. For example, if all $z_i$ are located between 0 and 1, then adding N more artificial points $z_{N+1}$, $z_{N+2}$, $z_{N+3}$, ..., $z_{2N}$ calculated by the formula $z_{N+i}=3-z_i$ to the array Z solves the problem; in this case, z=1.5 and is different from all 2N values of $z_i$. To make the number of components of the arrays Z and R equal, N more random numbers $r_i$ have to be added to the array R.

As soon as the array R is generated and the array C is calculated, the biometric array Z is discarded. The array C is an internal variable of a program running at on the client and the array R is an internal variable of a program running on the server. When the session ends, both C and R are discarded.

The fourth operation in the step 1:
the client generates a random pair of a private key and a public key for RSA encryption (as it is described in the U.S. Pat. No. 4,405,829) and submits the public key to the server. The public key will be used on the server until the end of the session. When the session ends, both the private key and the public key are discarded.

Figure 2:
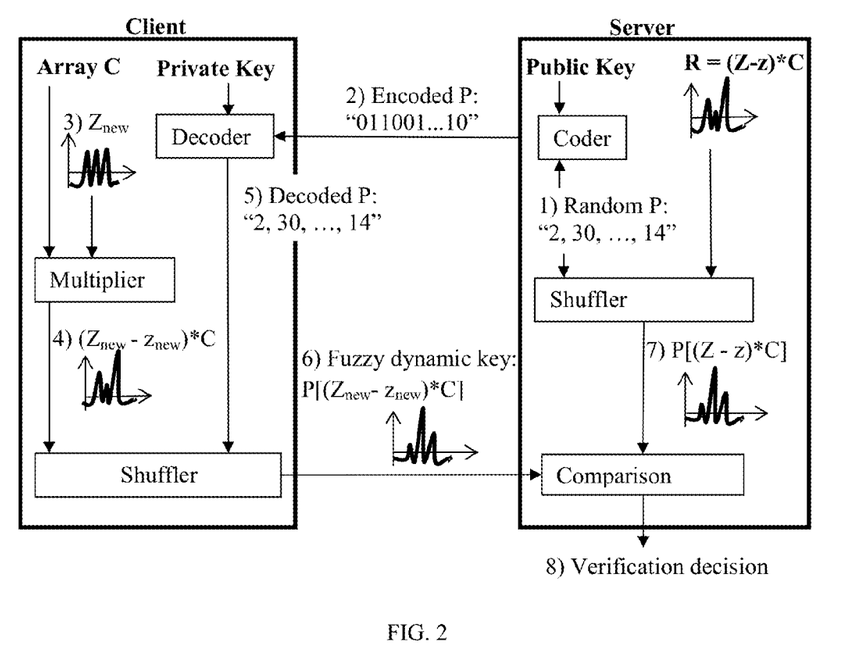
FIG. 2 illustrates the step of building a request key generated by the server, the step of creating a response key by the client, and the step of making a verification decision based on the response key.

FIG. 2 illustrates the steps 2, 3, 4, and 5 of the proposed method. The step 2: surveillance of the user starts from the moment when the user logs in to the server and ends at the moment when he logs out. The time of surveillance of the user in client-server communication consists of several periods, which are defined by server requests: each new authentication request generated by the server ends a current surveillance period and starts the next one. A server request is performed by sending a request key to the client (the step 3). The client builds a response key and submits it to the server (the step 4). The server makes a verification decision based on the response key (the step 5). All these steps are executed as follows.

To generate an authentication request, the server
1) Generates a random permutation P of N integers, for example, "4, 3, 2, 1, 5, 7, 6, 8, 16, 15, 14, 13, 9, 10, 11, 12, 20, 19, 18, 17, 21, 23, 22, 24, 32, 31, 30, 29, 25, 26, 27, 28" for N=32.
2) Encodes this string with the public key and sends it as a request key to the client.

To create a response key, the client
3) Extracts a biometric array $Z_{new}$ from the latest image of the user's face collected on the client.
4) Builds an array $(Z_{new}-z_{new})*C$, where $z_{new}$ is the average of the array $Z_{new}$ and C is the array that was created during the user login.
5) Using the private key, extracts the permutation P from the received encoded string.
6) Applies P to $(Z_{new}-z_{new})*C$ and submits the permuted array $P[(Z_{new}-z_{new})*C]$ to the server as a response key. Note that when $Z_{new}=Z$, this response key is exactly equal to P[R].

To perform an identity verification of the user, the server
7) Applies the permutation P to the representational array $R=(Z-z)*C$, which was created at the server during the login of the user to the session.
8) Calculates the correlation coefficient between the permuted array $P[(Z-z)*C]$ and the response key (which is the array $P[(Z_{new}-z_{new})*C]$).

If the correlation coefficient is close to 1 (greater than 0.5), the server remains accessible to the user; otherwise, his further access to the server is denied. The reason that the correlation coefficient is required to be close to 1 is as follows. If the average values of any two arrays A and B are equal to zero (it is the case for A=(Z-z) and for B=($Z_{new}-z_{new}$)) and the correlation coefficient between these arrays is equal to 1, then after multiplication of each of the arrays by the same array C (component-by-component), the correlation coefficient between arrays $\{a_1*c_1, a_2*c_2, a_3*c_3, \ldots, a_N*c_N\}$ and $\{b_1*c_1, b_2*c_2, b_3*c_3, \ldots, b_N*c_N\}$ is equal to 1 as well; a permutation of the last two arrays in the same order also does not change their correlation coefficient. If this correlation coefficient is equal to 1, it means that $Z=const*Z_{new}$. If the correlation coefficient is close to 1, it means that Z and $Z_{new}$ most probably are extracted from biometric data of the same user.

Figure 3:
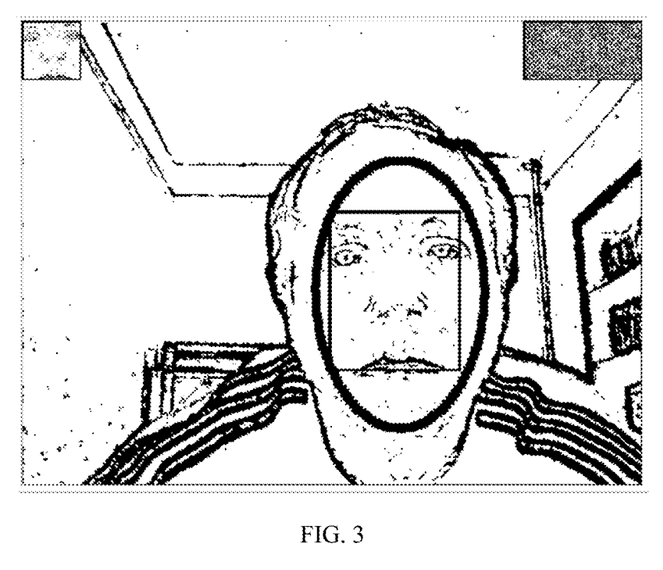
FIG. 3 illustrates a way of creating an array of biometric data based on of a facial image of a user.

FIG. 3 illustrates one of possible ways of creating a biometric array Z based on a facial image of a user. The process starts with recording a color picture 500×350 of a user by a webcam (all image dimensions are given in pixels). Then this picture is transformed using Sobel edge detection and histogram equalization to a black and white sketch, an example of which is shown in FIG. 3. After that, the approximate position of the user's head in the sketch is found using the assumption that the shape of the head can be considered as an ellipse. The problem of finding the position of the head is solved as the problem of finding the minimum of the function of four variables which are the coordinates of the center of the ellipse and the x-radius and y-radius of the ellipse. This ellipse is not shown in FIG. 3 to avoid clutter. When the position of the head is found, the next step is to find the approximate border of the user's face—the oval shown in FIG. 3. This oval is described by the formulas $x-x_0 = a*\sin t$ $y-y_0 = b*\cos t/(1+e*a*\sin t)$, where ($x_0$, $y_0$) are the coordinates of the center of the oval, a and b are the radii of the oval, e is a small number, and $0<=t<2*\pi$. The $x_0$, $y_0$, a, b, and e are found by the Monte Carlo method so that the 7-pixel wide border of the oval covers as little of black area in the sketch as possible. The next step of extracting the array Z is determining the position of the rectangle frame of minimum size that contains the user's brows, eyes, and the mouth as it is shown in FIG. 3.

The image in the frame is converted into a 48×48 image shown in the top left corner of the sketch in FIG. 3. This conversion makes the real size of the face irrelevant and compensates small rotations of the face around the x and y axes. To compensate errors related to small rotations of the face around the z-axis, the method of central moments is used: the image is rotated around the z-axis so that the mouth in the 48×48 image is always oriented horizontally.

As a result, the biometric array Z is presented as an array $\{z_i\}$ of the brightness intensity of each pixel in the frame, where $0<=i<2304$ (where 2304=48*48) and $0<=z_i<256$. The corresponding representational array R is an array of 4608 random numbers (twice as many as the number of the components in the array Z in order to avoid division by zero in formulas (1)); it is shown as the rectangle in the top right corner of the sketch in FIG. 3.

The response key $P[(Z_{new}-z_{new})*C]$ that the client creates based on a facial image of a user is the first part of a composite response key consisting of five parts.

Figure 4:
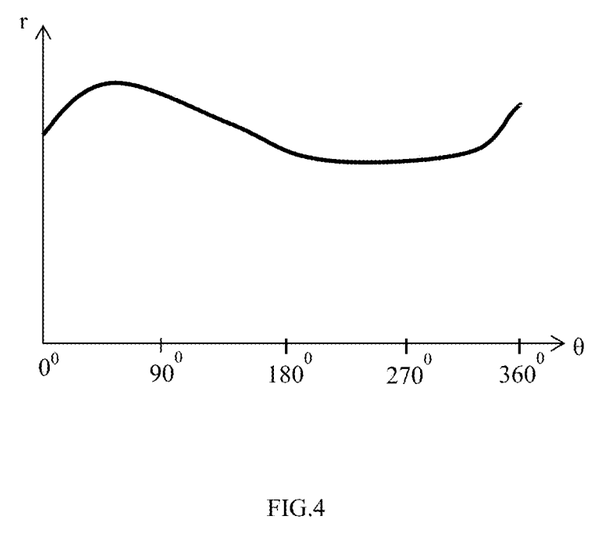
FIG. 4 illustrates the shape of an eye pupil presented in polar coordinates.

FIG. 4 illustrates another biometric array Z used in the proposed method. This array describes the boundary of the eye pupil of a user in polar coordinates—$r(\theta)$. If a pupil is an ideal circle, then $r(\theta)$=Const. In the method of person identification based on iris recognition (U.S. Pat. No. 5,291,560), the fact that a pupil is not a circle is undesirable and is compensated. Contrary to that, in the present invention, the shape $r(\theta)$ is used for verification purposes. The shape $r(\theta)$ is measured as it is described in Daugman J (2007), "New methods in iris recognition." *IEEE Trans. Systems, Man, Cybernetics B* 37(5), pp. 1167-1175. If the measurement unit of θ is equal 20°, then $r(\theta)$ can be presented as a biometric array of 18 numbers. A response key is calculated by the formula $P[(Z_{new}-z_{new})*C]$ where all variables are related to the pupil boundary. This response key is processed the same way as in the case of an array corresponding to a facial image. The response key $P[(Z_{new}-z_{new})*C]$ that the client creates based on a user's pupil shape is the second part of a composite response key.

Figure 5:
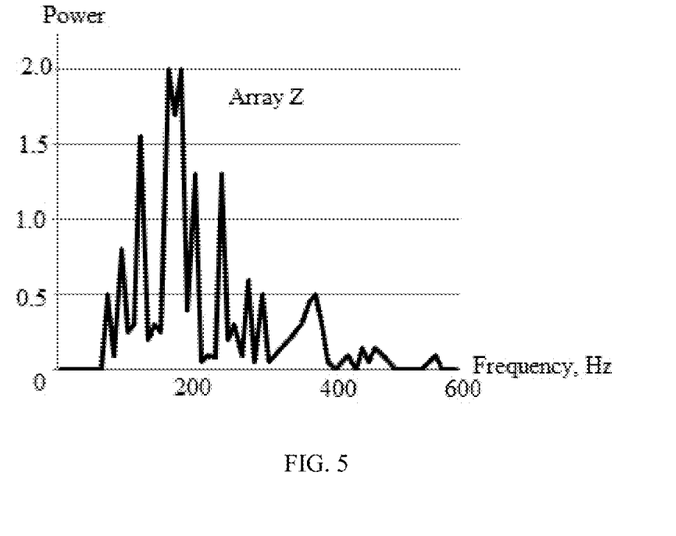
FIG. 5 illustrates the power spectrum density of the sound of a user's breathing.

FIG. 5 illustrates yet another biometric array Z used in the proposed method. It is an array of the power spectrum density extracted from the intensity of the sound of a user's breathing as it is described in the paper of M. Bahoura "Pattern recognition methods applied to respiratory sounds classification into normal and wheeze classes", Computers in Biology and Medicine, 2009, 39, 824-843. The array is extracted from data recoded by a microphone.

In the exemplary embodiment of the invention, only frequencies below 600 Hz are used to build such a biometric array. The interval between frequencies is equal to 10 Hz, so the array Z is presented by 60 numbers. In this case, an array C calculated on the client during a user's login and a random permutation P generated by the server on each authentication request comprise 60 numbers each. A response key is calculated by the formula $P[(Z_{new}-z_{new})*C]$ where all variables are related to a sound, not to an image. This response key is processed the same way as in the case of an array corresponding to a facial image. The response key $P[(Z_{new}-z_{new})*C]$ that the client creates based on a user's breathing sound is the third part of a composite response key.

Besides using arrays of different biometric modalities, the proposed method uses correlations between such arrays collected during the same surveillance period.

Figure 6:
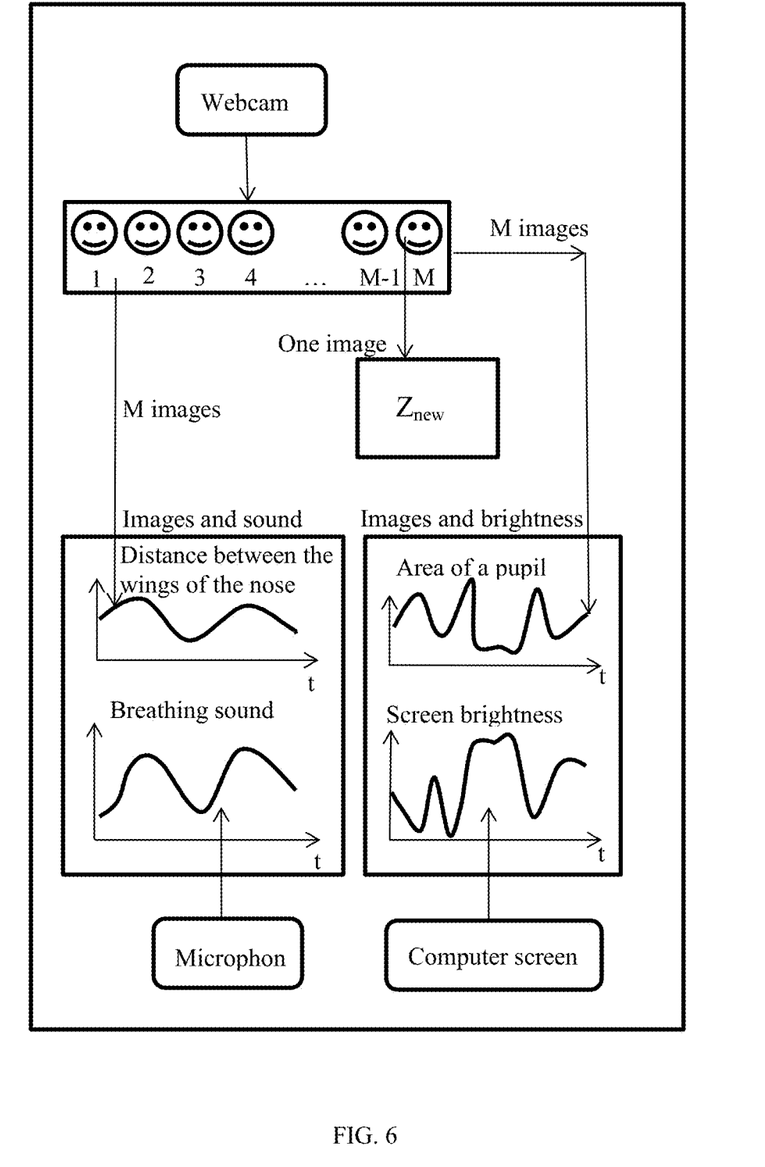
FIG. 6 illustrates the step of collecting biometric data of a user on the client during a session of client-server communication.

FIG. 6 illustrates the process of collecting different biometric modalities of a user. In the exemplary embodiment of the invention, biometric data is recorded by three sensors. One sensor is a webcam that takes a picture of the user's face every second. The second sensor is a microphone that records the sound of the user's breathing. The third sensor is a computer processor that calculates the brightness of the user's computer screen.

On each authentication request from the server, the client transforms biometric data of the user collected during a surveillance period and organizes this data into five groups:
  data related to a face image of the user;
  data related to his pupil shape;
  data related to his breathing sound;
  data related to a sequence of his images and to his breathing sound simultaneously;
  data related to a sequence of his images and to the brightness of his computer screen simultaneously. The client creates a response key comprising five parts based on data of all groups.

Creating the first part of the composite response key (related to a face image of the user and comprising 48×48 numbers), the second part (related to the user's pupil shape and comprising 18 numbers), and the third part (related to his breathing sound and comprising 60 numbers) is already described.

Creating the fourth part of the composite response key related to a sequence of images of the user's face and his breathing sound simultaneously is performed as follows.

Each of M images of the user's face recorded during a surveillance period is processed in order to calculate the distance δ between the most outer sides of the wings of his nose. As a result, a sequence of M distances measured each second is created:

$$\Delta = \{\delta_1, \delta_2, \delta_3, \ldots, \delta_{M-1}, \delta_M\}.$$

The intensity of the breathing sound of the user is defined as a time series $$D = \{d_1, d_2, d_3, \ldots, d_M\},$$

where $d_i$ is the average intensity of the sound recorded during the $i^{-th}$ second.

If an increase in the intensity of the sound follows an increase in the distance δ with a delay of n seconds, then the maximum correlation coefficient between Δ and D is reached when Δ is shifted relative to D by n seconds. This fact allows calculating the value of n. For Δ and D of the same person, such a delay is less than one second and n=0. So if n is not equal to 0, there is most likely an imitation of the user.

The fourth part of the composite response key is presented by two numbers—the shift n of Δ relative to D and the correlation coefficient between Δ and D. If n=0 and the correlation coefficient is greater than 0.5, then authentication related to the fourth part of the response key is recommended.

Creating the fifth part of the composite response key related to a sequence of images of the user's face and to the brightness of his computer screen simultaneously is performed as follows.

Each of M images of the user's face recorded during a surveillance period is processed in order to calculate the area of his pupil. As a result, a sequence of M areas is created:

$$A = \{a_1, a_2, a_3, \ldots, a_{M-1}, a_M\}.$$

The average brightness of the user's computer screen during each of M seconds is calculated by the computer processor:

$$B = \{b_1, b_2, b_3, \ldots, b_{M-1}, b_M\}.$$

The range of the brightness values can be significant. For example, during a download of a document using Microsoft Internet Explorer the brightness of a computer screen is low; see FIG. 7. As the download is completed, the brightness of the screen increases, so the radius of the user's pupil decreases accordingly. The delay between the end of the download and the change of the pupil radius is less than a second.

Figure 7:
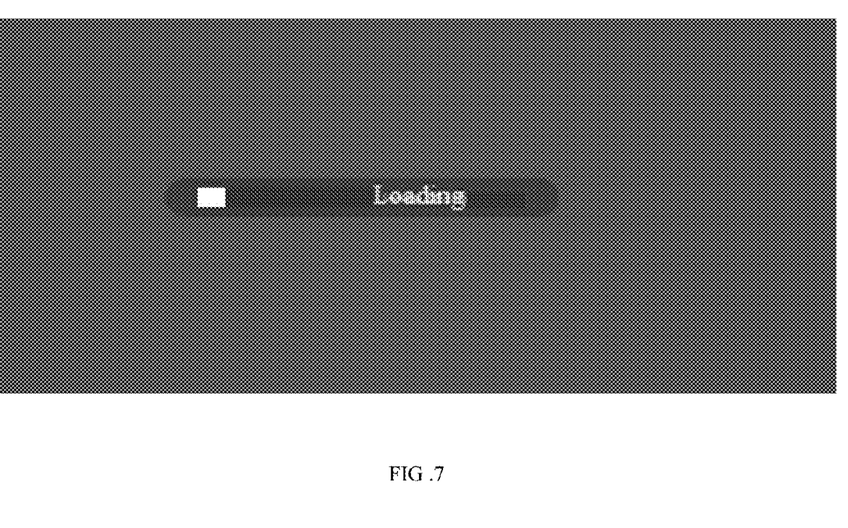
FIG. 7 illustrates a low brightness of a computer screen during downloads from the server.

The fifth part of the composite response key is presented by a single number that is the correlation coefficient between the series A and the series B. If the correlation coefficient is less than −0.5, then authentication related to the fourth part of the response key is recommended.

If all five parts of the composite response key recommend authentication, the user will be granted with further access to the server. If the first part of the composite response key does not recommend the authentication, the user's access to the server will be denied. The other cases of partial authentication can be resolved by more complicated rules.

Figure 8:
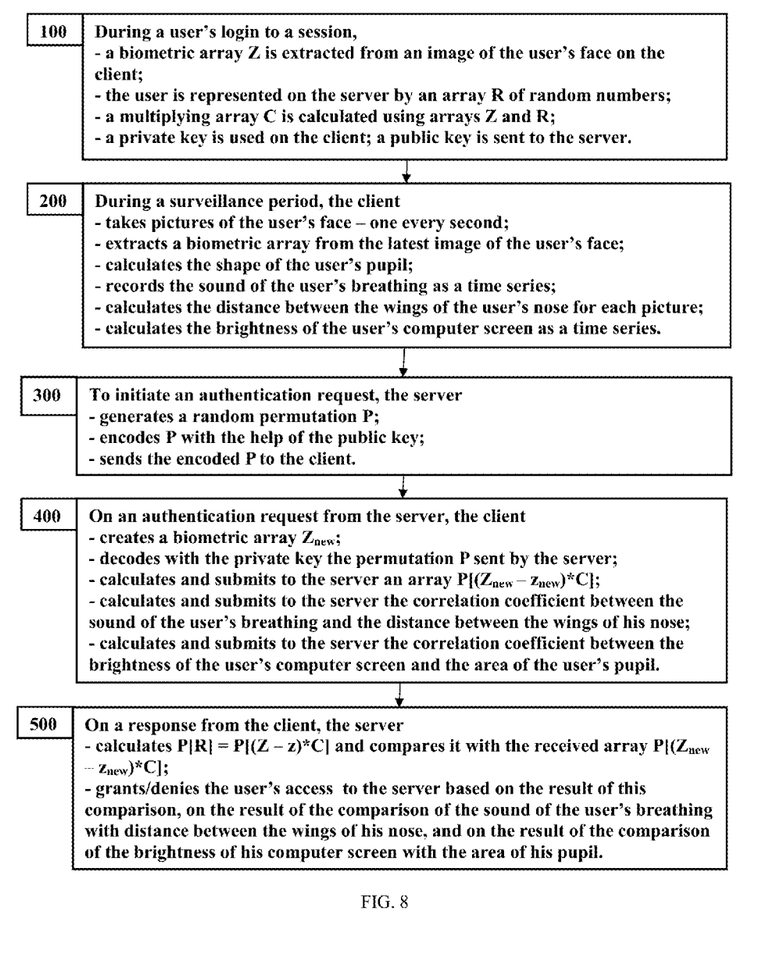
FIG. 8 is a flowchart of the proposed method.

FIG. 8 illustrates a flowchart of the proposed method in accordance with the invention:
  Step 100 includes the main operations during a user's login to a session of client-server communication.
  Step 200—the main operations on the client during a surveillance period.
  Step 300—the main operations on the server in order to generate an authentication request.
  Step 400—the main operations on the client on a request from the server.
  Step 500—the main operations on the server on a response from the client; granting/denying the user's access to the server.

The biometric encryption proposed in the present invention is practically unbreakable by hackers. A hacker's time to operate is limited by the length of a session because private and public keys, a multiplication array C, and a representational array R are different in each session. A permutation P is different for each request and a fuzzy dynamic response key is different for each response. To get access to the server, the hacker has to produce a permuted representational array; having just a representational array is not enough for that. The hacker can intercept an encoded permutation string sent from the server, but he has to decode it in order to build a permuted representational array. However, the corresponding private key to do that is not available to him since it is not stored anywhere (it is an internal variable of a program running on the client). So the hacker can only use the trial and error method. In the proposed scheme, he has just one attempt to break encryption per response because permutations are randomly generated for each request. If a hacker breaks RSA encryption, he can get access to an authorized user's account. Nevertheless, even in this case, real biometric data of the user is inaccessible to the hacker because the number of transformations from $(Z-z)*C$ to Z is infinite.

The proposed active authentication method with fuzzy dynamic keys is also very difficult to fool by an imitation of an authorized user. To do that, the hacker has to simultaneously
- imitate static and dynamic images of the user's face,
- imitate the shape of the user's pupil,
- imitate the sound of the user's breathing,
- imitate a correlation between real biometric characteristics of the user,
- imitate a correlation between the brightness of the user's computer screen and the area of the user's pupil.

The other advantages of the method are as follows:
- a user is represented at the server by a set of random numbers that have nothing to do with his biometric data, so real biometric data cannot be retrieved even theoretically from a data of the server if it is compromised,
- the method provides zero leakage of the privacy of a user because none of biometric data is stored on hardware of the server or the client and none of biometric data is transmitted between them;
- the fuzzy dynamic keys created by the client are not saved anywhere, so there is no need to create/memorize/store any passwords; there is also no need to store any helper data;
- the method is resistant to known types of attacks, including offline attacks,
- the method provides regular frequent authentications of a user without interruption of his activity from the beginning of a session to the end.

Although the present invention has been described in terms of the preferred embodiments, it is to be understood that the disclosure is not to be interpreted as limiting. Various modifications will become apparent to those skilled in the art after having read this disclosure. For example, instead of using a distance $\delta$, it is possible to use different variable, e.g., the relative position of two points: one on the face of a user and another on his shoulder. Sound recognition can be performed by different methods, e.g., by using fractal dimension of time series. Changes in the brightness of a computer screen can be initiated by the server during a user's login to a session and during the session. The reaction of a pupil on changes in the brightness can be saved on the server in a transformed form and used similarly to the saved transformed array Z. The sound of breathing also can be saved on the server in a transformed form, etc. Instead of using 48*48 components $z_i$ of a matrix extracted from a facial image, only 48 components of the singular value decomposition of this matrix can be used. All mentioned modifications of the proposed method do not change it radically. Accordingly, it is intended that the appended claims be interpreted as covering all alterations and modifications within the spirit and scope of the invention.

The invention claimed is:

1. A method for active biometric user authentication during a session of client-server communication comprising the following steps: a login of a user to a session, surveillance of the user, requests generated by the server, responses generated by the client, and identity verifications of the user performed by the server where the step "a login of a user to a session" comprises: —extracting a biometric array $Z=\{zi, Z2, Z3, \ldots, ZN\}$ from an image of the user's face recorded by a webcam, where N is the number of components in the array Z; —generating, on the client, a random pair of a private key and a public key unrelated to the user's biometry, —submitting the public key to the server, —extracting a biometric array $Z=\{zI, Z2, Z3, \ldots, ZN)$ from an image of the user's face recorded by a webcam, where N is the number of components in the array, —generating, on the server, an array of random numbers $R=\{ri, r2, r3, \ldots, rN)$ unrelated to the user's biometry and representing the user, —submitting the public key to the server; the step "surveillance of the user" comprises: —recording a sequence of images of the user's face by the webcam; the step "requests generated by the server" comprises: —generating a random permutation of N integers; —encoding the permutation with the help of the public key; —sending the encoded permutation to the client; the step "responses generated by the client" comprises: —extracting a biometric array $Znew=\{Znew1, Znew2, Znew3, \ldots, ZnewN\}$ from the latest image from the sequence of images of the user's face; —calculating a —representational array $Rnew=\{(Znew1-Znew)*CI, (Znew2-Znew)*c2, \ldots, (ZnewN-Znew)*CN\}$, where $Znew=(Znew1+Znew2+Znew3+.+ZnewN)/N$; —decoding with the help of the private key the encoded permutation received from the server; —applying the decoded permutation to the array Rnew; —submitting the permuted array to the server; the step "identity verifications of the user performed by the server" comprises: —applying the permutation created in the step "requests generated by the server" to the array R created in the step "a login of a user to a session"; comparing this permuted array with the array submitted by the client as the response to the server request; —making a verification decision based on the correlation coefficient between these two arrays: access to the server is recommended if the coefficient is greater than 0.5; recording the intensity of the sound of the user's breathing as a time series by a microphone; in the step "a login of a user to a session", creating the biometric array $Z=\{zi, Z2, Z3, \ldots, ZN\}$ is accomplished by extracting this array as power spectrum density of the time series of the intensity of the sound of the user's breathing; the step "surveillance of the user" further comprises: breathing by the microphone; in the step "responses generated by the client", —creating the biometric array Znew is accomplished by extracting this array as power spectrum density from the latest time series of the intensity of the sound of the user's breathing; extracting a time series of the distance between the most outer sides of the wings of the user's nose from the sequence of images of the user's face recorded by the webcam; calculating the correlation coefficient between this time series and the time series of intensity of the sound of the user's breathing; —submitting the correlation coefficient to the server; the step "identity verifications of the user performed by the server" further comprises: making a verification decision: access to the server is recommended if the correlation coefficient is greater than 0.5; changing the brightness of the user's computer screen by a computer program on any download requested by the client; recording the brightness of the user's computer screen as a time series; the step "responses generated by the client" further comprises: extracting a time series of the areas of the user's pupil from the latest sequence of images of the user's face; the brightness of the user's computer screen; submitting this correlation coefficient to the server; the step "identity verifications of the user performed by the server" further comprises: making a verification decision: access to the server is recommended if the correlation coefficient is less than (−0.5).

2. The method of claim 1 wherein, in the step "a login of a user to a session", —extracting the biometric array $Z=\{z_i, z_2, Z_3, \ldots, ZN\}$ is accomplished by extracting this array from the shape of the user's pupil obtained from an image of the user's face recorded by a webcam; in the step "responses generated by the client", —extracting the biometric array Znew is accomplished by extracting this array from the shape of the user's pupil obtained from the latest image from the sequence of images of the user's face.

\* \* \* \* \*